US008989328B2

(12) United States Patent
Wong (10) Patent No.: US 8,989,328 B2
(45) Date of Patent: Mar. 24, 2015

(54) SYSTEMS AND METHODS FOR SERIAL COMMUNICATION

(71) Applicant: QUALCOMM Incorporated, San Diego, CA (US)

(72) Inventor: Brian L. Wong, Pleasanton, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/829,748

(22) Filed: Mar. 14, 2013

(65) Prior Publication Data

US 2014/0269854 A1   Sep. 18, 2014

(51) Int. Cl.
| H04L 7/00 | (2006.01) |
| H04L 25/06 | (2006.01) |
| G06F 13/42 | (2006.01) |
| H04L 12/28 | (2006.01) |
| H04W 76/02 | (2009.01) |

(52) U.S. Cl.
CPC ............ *H04L 25/06* (2013.01); *G06F 13/4291* (2013.01); *H04L 12/28* (2013.01); *H04W 76/023* (2013.01)
USPC ........... 375/355; 375/371; 375/286; 375/288; 375/395; 375/316; 375/354; 375/356

(58) Field of Classification Search
USPC ......... 375/371, 286, 288, 395, 316, 354, 355, 375/356
See application file for complete search history.

(56) References Cited

U.S. PATENT DOCUMENTS

| 7,106,103 | B2 | 9/2006 | Smith et al. | |
| 7,308,516 | B2 * | 12/2007 | Dressen et al. | 710/110 |
| 7,430,259 | B2 * | 9/2008 | North et al. | 375/354 |
| 7,668,995 | B2 * | 2/2010 | Hayashita | 710/110 |
| 8,185,680 | B2 * | 5/2012 | Drexler et al. | 710/119 |
| 8,345,704 | B2 * | 1/2013 | Desai et al. | 370/438 |
| 8,489,786 | B2 * | 7/2013 | Radhakrishnan et al. | 710/110 |
| 2005/0005049 | A1 * | 1/2005 | Montalvo et al. | 710/110 |
| 2006/0031618 | A1 | 2/2006 | Hansquine et al. | |
| 2006/0153326 | A1 * | 7/2006 | Choi | 375/360 |
| 2007/0130401 | A1 * | 6/2007 | Baker et al. | 710/62 |
| 2010/0088436 | A1 | 4/2010 | Knauss et al. | |
| 2010/0117691 | A1 * | 5/2010 | Lory et al. | 327/141 |

FOREIGN PATENT DOCUMENTS

| EP | 0258873 A2 | 3/1988 |
| WO | WO-2007143695 A2 | 12/2007 |

OTHER PUBLICATIONS

Tran D., "AN-2173 I2C communication over FPD-link iii with bidirectional control channel," National Semiconductor Application Note 2173, Jul. 14, 2011, 6 pages.
International Search Report and Written Opinion—PCT/US2014/029183—ISA/EPO—Jul. 22, 2014.

* cited by examiner

*Primary Examiner* — Siu Lee
(74) *Attorney, Agent, or Firm* — Bay Area Technology Law Group PC (57) ABSTRACT

This disclosure includes a point-to-point two-lineserial interface (TSI) suitable for use in a wireless communications device as well as in other applications. The TSI may employ a protocol providing multiple frame formats to achieve delivery of one type of message with a reduced latency and other messages at increased latencies. Further, although the master initiates reads, the slave circuit may signal the master in real time over the TSI.

31 Claims, 7 Drawing Sheets

SYSTEMS AND METHODS FOR SERIAL COMMUNICATION

FIELD OF THE PRESENT INVENTION

The present invention relates generally to serial communications systems configured for use with integrated circuits, for example for serial communication between components using a two line bus interface.

BACKGROUND OF THE INVENTION

Electronic components often feature a chipset-based design architecture, in which a group of integrated circuits (ICs) work together with each chip configured to perform specific functions. For example, in the context of a wireless communications device, a baseband processor may interface with one or more radio frequency (RF) or other components. The baseband processor may generate and receive baseband signals, often in digital format. One or more Integrated Circuits (ICs) may be deployed to provide functions such as analog to digital conversion, digital to analog conversion, filtering, amplification, upconversion, downconversion, and many others. Various parameters and commands may be written between these devices, such as with regard to the baseband processor providing coordination and control functions of the respective subsidiary components. Similarly, the baseband processor may need to receive (i.e. read) parameters and other data from one or more ancillary components (such as RF ICs). Although described in the context of a wireless communications device, similar relationships may be deployed in devices outside of the communications field as well.

For example, in a mobile wireless communication device, the host CPU and associated circuitry may be provided on one chip while the RF transceiver may be provided on another chip. Such designs may require one or more suitable interfaces between the chips to allow transfer of data. Typically, these interfaces are subject to various requirements including bandwidth and latency. Depending upon the design of the interface, it may include one or more wires. Since each line, or wire, consumes an input/output pin of the connected ICs, it may be desirable to reduce the number of wires employed by the interface, while still satisfying important performance characteristics.

A Serial Bus Interface (SBI) protocol has been deployed in the prior art, which uses three signals to perform communication between a master device and one or more slave devices (i.e. a 3-wire interface). While the SBI protocol allows for multiple slaves to share one interface, some components have demonstrated sensitivity to activity of other components on a shared interface. Thus, some SBI interfaces have been deployed with a single master and a single slave device, to avoid such interference. Adding additional interfaces, as described, may require the addition of three pins (or pads) to the master device for each additional interface. This may add additional complexity and/or cost, due to increased die size, increased pin count, etc. Other conventional serial interfaces may have even higher pin requirements.

Accordingly, there is a need for a two-line point-to-point serial interface suitable for controlling an RF transceiver module as well as other applications. There is also a need for an interface capable of preferentially delivering some types of information at reduced latency. Further, there is a need for serial communication systems having reduced pin counts. The systems and methods of this disclosure satisfy these and other needs.

SUMMARY OF THE INVENTION

This specification discloses methods for communication between a master circuit and a slave circuit through a two-line interface including a first line and a second line. Such methods may include biasing the first line to a first logical value when the first line is not being driven by the master circuit and is not being driven by the slave circuit, driving the second line at the first logical value by the master circuit, providing the slave circuit with control of the first line, driving a clock signal on the second line by the master circuit, detecting the clock signal by the slave circuit, driving a first sequence of bits on the first line by the master circuit, and sampling the first sequence of bits by the slave circuit. Further, the slave circuit may determine a length and identity of a command prefix at the slave circuit based on a value of a command prefix. Additionally, the first sequence of bits may include a data field following the command prefix, the data field having a predefined number of data bits.

In another aspect, the first sequence of bits may include a length field and a data field following the command prefix, the length field specifying a number of data bits in the data field. Additionally, control of the first line may be returned to the slave circuit after driving the first sequence of bits. Further, the slave circuit may drive a second sequence of bits on the first line after control of the first line is returned to the slave circuit.

Methods of the disclosure may also include driving the first line to a second logical value by the slave circuit before driving the clock signal on the second line and detecting the second logical value on the first line by the master circuit, wherein the master circuit drives the clock signal on the second upon detecting the second logical value. Further, the first sequence of bits may include a command prefix consisting of one bit and a data field following the command prefix, the data field having a predefined number of bits. Additionally, the master circuit may detect an error before driving the first sequence of bits, so that the first sequence of bits may include a command prefix having a first bit driven at the first logical value by the master circuit and a plurality of successive bits driven at the first logical value from the first line bias. In such embodiments, the slave circuit may determine a length and an identity of a command based on values of the bits of a command prefix and may drive a second sequence of bits having a predefined pattern on the first line after control of the first line is returned to the slave circuit. In response, the master circuit may detect the predefined pattern by the master circuit and drive the second line at the first logical value based on detecting the predefined pattern.

In another aspect, the method may include driving a command prefix, driving a data field following the command prefix, and driving a receive gain adjustment between the master circuit implemented in a baseband processor of a wireless communications device and the slave circuit implemented in a wireless transceiver. Further, the first line may be driven to a second logical value by the slave circuit before driving the clock signal on the second line the master circuit may detect the second logical value on the first line such that the master circuit may drive the clock signal on the second line based on detection of the second logical value. The wireless transceiver may detect a radio frequency (RF) saturation condition so that the slave circuit drives the first line to the second logical value in response to the detection.

In yet another aspect, driving the first sequence of bits may include driving a coexistence message between the master circuit implemented in a baseband processor of a wireless communications device and the slave circuit implemented in a Bluetooth transceiver.

This disclosure also includes systems for communication such as a serial communications interface having a master circuit, a slave circuit, a first line between the master circuit and the slave circuit, and a second line between the master circuit and the slave circuit, wherein the interface may bias the first line to a first logical value when the first line is not being driven by the master circuit and is not being driven by the slave circuit, wherein the master circuit may selectively drive the second line with one of a clock signal and the first logical value, wherein the slave circuit may control the first line when the master circuit is driving the second line at the first logical value, wherein the master circuit may transmit a first sequence of bits to the slave circuit on the first line after driving the clock signal on the second line, and wherein the slave circuit may sample the first sequence of bits after detecting the clock signal on the second line. The slave circuit may determine a length and an identity of a command at the slave circuit based on a value of a command prefix. Additionally, the first sequence of bits may include a data field following the command prefix, the data field having a predefined number of data bits.

In another aspect, the first sequence of bits may include a length field and a data field following the command prefix, the length field specifying a number of data bits in the data field. Additionally, control of the first line may be returned to the slave circuit after driving the first sequence of bits. Further, the slave circuit may drive a second sequence of bits on the first line after control of the first line is returned to the slave circuit.

In another aspect, the slave circuit may drive the first line to a second logical value while the master circuit is driving the second line at the first logical value, and the master circuit may detect the second logical value on the first line and drive the clock signal on the second line upon detecting the second logical value. Further, the first sequence of bits may include a command prefix consisting of one bit and a data field following the command prefix, the data field having a predefined number of bits. Additionally, the master circuit may detect an error before driving the first sequence of bits, so that the first sequence of bits may include a command prefix having a first bit driven at the first logical value by the master circuit and a plurality of successive bits driven at the first logical value by the first line bias. In such embodiments, the slave circuit may determine a length and an identity of a command based on a value of the command prefix and may drive a second sequence of bits having a predefined pattern on the first line after control of the first line is returned to the slave circuit. In response, the master circuit may detect the predefined pattern by the master circuit and drive the second line at the first logical value based on detecting the predefined pattern.

In one embodiment, the master circuit may be implemented in a baseband processor of a wireless communications device and the slave circuit may be implemented in a wireless transceiver. For example, the master circuit may drive the first sequence of bits by driving a command prefix, driving a data field following the command prefix, and driving a receive gain adjustment for the wireless transceiver. Further, the slave circuit may drive the first line to a second logical value and the master circuit may detect the second logical value on the first line such that the master circuit may drive the clock signal on the second line based on detection of the second logical value. The wireless transceiver may detect a radio frequency (RF) saturation condition so that the slave circuit drives the first line to the second logical value in response to the detection.

In yet another embodiment, the master circuit may be implemented in a baseband processor of a wireless communications device, the slave circuit may be implemented in a Bluetooth transceiver, and the master circuit may drive the first sequence of bits by driving a coexistence message.

This disclosure also includes a serial communications interface a master circuit, a slave circuit, a first line between the master circuit and the slave circuit, a second line between the master circuit and the slave circuit, means for biasing the first line to a first logical value when the first line is not being driven by the master circuit and is not being driven by the slave circuit, means for driving the second line at the first logical value by the master circuit, means for providing the slave circuit with control of the first line, means for driving a clock signal on the second line by the master circuit, means for driving a first sequence of bits on the first line by the master circuit, means for detecting the clock signal by the slave circuit, and means for sampling the first sequence of bits by the slave circuit.

Further, the slave circuit may include means for determining a length and identity of a command prefix based on a value of a command prefix. Additionally, the first sequence of bits may include a data field following the command prefix, the data field having a predefined number of data bits.

In another aspect, the first sequence of bits may include a length field and a data field following the command prefix, the length field specifying a number of data bits in the data field. Additionally, means for returning control of the first line to the slave circuit after driving the first sequence of bits may be included. Further, the slave circuit may include means for driving a second sequence of bits on the first line after control of the first line is returned to the slave circuit.

The serial communications interface may also include means for driving the first line to a second logical value by the slave circuit before driving the clock signal on the second line and means for detecting the second logical value on the first line by the master circuit, wherein the master circuit drives the clock signal on the second upon detecting the second logical value. Further, the first sequence of bits may include a command prefix consisting of one bit and a data field following the command prefix, the data field having a predefined number of bits. Additionally, the master circuit may include means for detecting an error before driving the first sequence of bits, so that the first sequence of bits may include a command prefix having a first bit driven at the first logical value by the master circuit and a plurality of successive bits driven at the first logical value from the first line bias. In such embodiments, the slave circuit may include means for determining a length and an identity of a command based on a value of the command prefix and means for driving a second sequence of bits having a predefined pattern on the first line after control of the first line is returned to the slave circuit. In response, the master circuit may include means for detecting the predefined pattern by the master circuit and means for detecting the second line at the first logical value upon detecting the predefined pattern.

In another aspect, the master circuit may include means for driving a command prefix, means for driving a data field following the command prefix, and means for driving a receive gain adjustment between the master circuit implemented in a baseband processor of a wireless communications device and the slave circuit implemented in a wireless transceiver. Further, the slave circuit may include means for driving the first line to a second logical value before driving the clock signal on the second line and the master circuit may include means for detecting the second logical value on the first line such that the master circuit may drive the clock signal on the second line upon detection of the second logical value. The wireless transceiver may detect a radio frequency (RF) saturation condition so that the slave circuit drives the first line to the second logical value in response to the detection.

In yet another aspect, driving the first sequence of bits may include driving a coexistence message between the master circuit implemented in a baseband processor of a wireless communications device and the slave circuit implemented in a Bluetooth transceiver.

BRIEF DESCRIPTION OF THE DRAWINGS

Further features and advantages will become apparent from the following and more particular description of the preferred embodiments of the invention, as illustrated in the accompanying drawings, and in which like referenced characters generally refer to the same parts or elements throughout the views, and in which.

DETAILED DESCRIPTION OF THE INVENTION

At the outset, it is to be understood that this disclosure is not limited to particularly exemplified materials, architectures, routines, methods or structures as such may, of course, vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present invention and is not intended to represent the only exemplary embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

For purposes of convenience and clarity only, directional terms, such as top, bottom, left, right, up, down, over, above, below, beneath, rear, back, and front, may be used with respect to the accompanying drawings or chip embodiments. These and similar directional terms should not be construed to limit the scope of the invention in any manner.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

The terms second level and first level, high and low and 1 and 0, as used in the following description may be used to describe various logic states as known in the art. Particular voltage values of the second and first levels are defined arbitrarily with regard to individual circuits. Furthermore, the voltage values of the second and first levels may be defined differently for individual signals such as a clock and a digital data signal. Although specific circuitry has been set forth, it will be appreciated by those skilled in the art that not all of the disclosed circuitry is required to practice the invention. Moreover, certain well known circuits have not been described, to maintain focus on the invention. Similarly, although the description refers to logical "0" and logical "1" or low and high in certain locations, one skilled in the art appreciates that the logical values can be switched, with the remainder of the circuit adjusted accordingly, without affecting operation of the present invention.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

One or more exemplary embodiments described herein are set forth in the context of a digital wireless data communication system. While use within this context is advantageous, different embodiments of the invention may be incorporated in different environments or configurations. In general, the various systems described herein may be formed using software-controlled processors, integrated circuits, or discrete logic. The data, instructions, commands, information, signals, symbols, and chips that may be referenced throughout the application are advantageously represented by voltages, currents, electromagnetic waves, magnetic fields or particles, optical fields or particles, or a combination thereof. In addition, the blocks shown in each block diagram may represent hardware or method steps.

Examples of a wireless communications device that may employ aspects of this disclosure may include any suitable type of user equipment, such as a system, subscriber unit, subscriber station, mobile station, mobile wireless terminal, mobile device, node, device, remote station, remote terminal, terminal, wireless communication device, wireless communication apparatus or user agent. Further examples of a wireless communications device include mobile devices such as a cellular telephone, cordless telephone, Session Initiation Protocol (SIP) phone, smart phone, wireless local loop (WLL) station, personal digital assistant (PDA), laptop, handheld communication device, handheld computing device, satellite radio, wireless modem card and/or another processing device for communicating over a wireless system. Moreover, embodiments may also be described herein with regard to a base station. A base station may be utilized for communicating with one or more wireless nodes and may be termed also be called and exhibit functionality associated with an access point, node, Node B, evolved NodeB (eNB) or other suitable network entity. A base station communicates over the air-interface with wireless terminals. The communication may take place through one or more sectors. The base station may act as a router between the wireless terminal and the rest of the access network, which may include an Internet Protocol (IP) network, by converting received air-interface frames to IP packets. The base station may also coordinate management of attributes for the air interface, and may also be the gateway between a wired network and the wireless network. Further, the wireless communications device may employ any suitable wireless protocol, including, for example, long term evolution (LTE), code division multiple access (CDMA) networks, high speed packet access (HSPA(+)), high-speed downlink packet access (HSDPA), global system for mobile communications (GSM), enhanced data GSM environment (EDGE), an IEEE 802.11-based wireless local area network (WLAN), WiMax®, BLUETOOTH® (Bluetooth), ZigBee®, wireless universal serial bus (USB), and others.

Unless defined otherwise, all technical and scientific terms used herein have the same meaning as commonly understood by one having ordinary skill in the art to which the disclosure pertains.

Finally, as used in this specification and the appended claims, the singular forms "a," "an" and "the" include plural referents unless the content clearly dictates otherwise.

As will be described in detail below, this disclosure includes a point-to-point two-line serial interface (TSI) suitable for use in a wireless communications device as well as in other applications. The TSI may employ a protocol providing multiple frame formats to achieve delivery of one type of message with a reduced latency and other messages at increased latencies. Further, although the master initiates reads, the slave circuit may signal the master in real time over the TSI.

Figure 1:
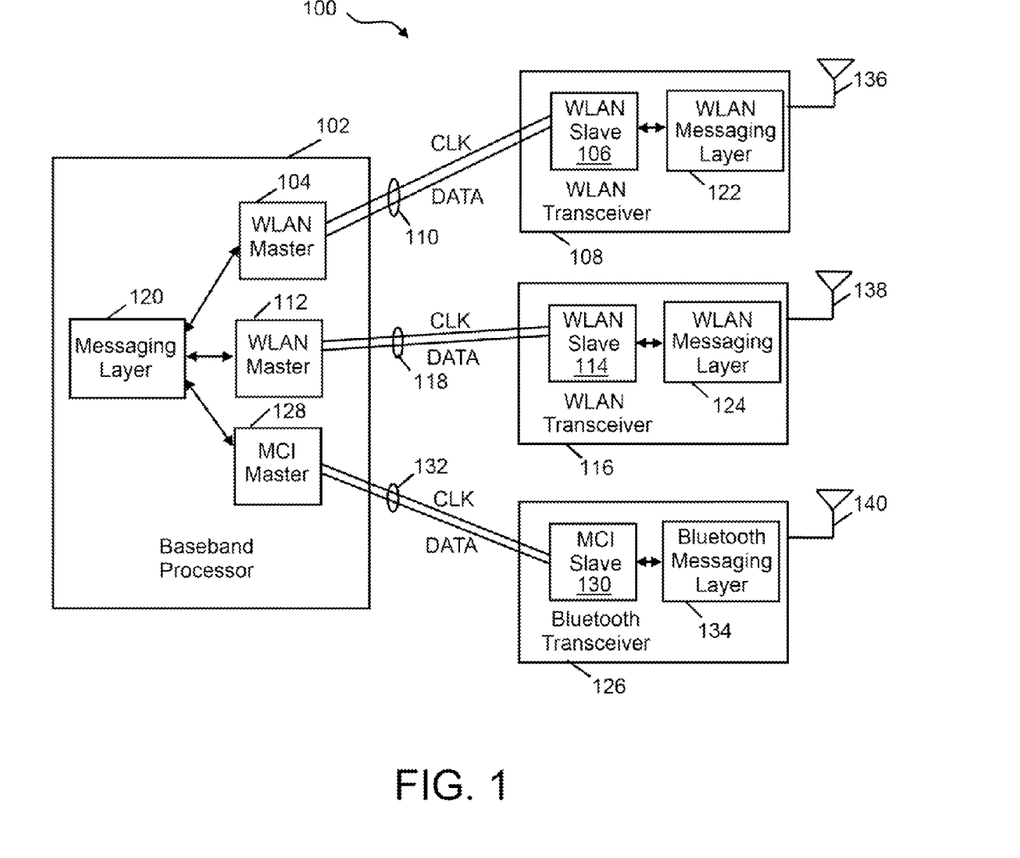
FIG. 1 schematically depicts functional blocks of a wireless communications device implementing a two-line serial interface, according to an embodiment of the invention.

To help illustrate aspects of this disclosure, a simplified block diagram of wireless communications device 100 is depicted in FIG. 1. As demonstrated by this example, baseband processor 102 may communicate with a number of subsidiary integrated circuits (IC) modules, as well as other components (not illustrated here for the sake of clarity). Typical functions performed by baseband processor 102 include digital processing of incoming and outgoing signals, and various other types of processing, including running various applications. Baseband processor 102 may comprise various components, including one or more microprocessors, digital signal processors, memory, and other general or special purpose circuitry of various types. Further, baseband processor 102 may comprise various components for receiving and transmitting signals according to one or more communications specifications or standards, such as encoders, interleavers, modulators, decoders, deinterleavers, demodulators, searchers, and various other components, examples of which are well know in the art. As desired, baseband processor 102 may incorporate digital circuitry, analog circuitry, or a combination of both.

In this depicted embodiment, a first WLAN physical layer (PHY) master circuit 104 of baseband processor 102 is shown to communicate with a first WLAN PHY slave circuit 106 of WLAN transceiver 108 over TSI 110. Similarly, a second WLAN physical layer (PHY) master circuit 112 communicates with WLAN PHY slave circuit 114 of WLAN transceiver 116 over TSI 118. WLAN transceivers 108 and 116 may be employed to provide wireless communications device 100 with enhanced capabilities using techniques such as multiple input multiple output (MIMO), dual band dual concurrency (DBDC), and the like. Each PHY layer master circuit may exchange information with a messaging layer to provide additional functionality, as will be described below. Correspondingly, baseband processor 102 may include messaging layer 120 configured to receive and transmit information with WLAN master circuit 104 and WLAN master circuit 112. Likewise, each WLAN transceiver may also implement a messaging layer as shown, with WLAN messaging layer 122 communicating with slave circuit 106 and WLAN messaging layer 124 communicating with slave circuit 114.

Further, wireless communications device 100 also provides Bluetooth functionality in this embodiment. As such, wireless communications device 100 includes Bluetooth transceiver 126. To help minimize conflicts between the Bluetooth and WLAN systems, baseband processor 102 may include a messaging coexistence interface (MCI) master circuit 128 that communicates with MCI slave circuit 130 of Bluetooth transceiver 126 over TSI 132 to coordinate operation of the Bluetooth and WLAN systems. MCI master circuit 128 may communicate with messaging layer 120 in baseband processor 102 and MCI slave circuit 130 may communicate with messaging layer 134 implemented in Bluetooth transceiver 126.

WLAN transceivers 108 and 116 are coupled to antennas 136 and 138, respectively, while Bluetooth transceiver 126 is coupled to antenna 140. For illustration purposes only, one antenna is shown for each transceiver, but for wireless communications, multiple antennas for each transceiver may be used as desired, or antennas may be shared using conventional antenna switching techniques. Depending upon the configuration, each of the transceivers may include components for providing various functions associated with the reception and transmission of RF signals such as amplifiers, filters, mixers, oscillators, digital-to-analog converters (DACs), analog-to-digital converters (ADCs), and the like. The components necessary for communication according to a standard may be incorporated into multiple transceivers as warranted and any transceiver may include components that may be shared for use with other transceivers. Further, transceivers are shown for illustration only and any type of subsidiary IC may be coupled to baseband processor 102 by a TSI as desired.

Each TSI may be a source synchronous interface between a single master circuit and a single slave circuit as shown. Further, each TSI may be implemented as a two-line interface such that a master circuit and a slave circuit are coupled by a data line (DATA) and a clock line (CLK). CLK may be driven by the master circuit and the DATA may be driven by either the master circuit or the slave circuit, to provide bi-directional transfer of information. DATA may be biased to either a logical high or a logical low value when neither the master circuit nor the slave circuit are actively driving it. In one aspect, DATA may be implemented with weak pull-down resistance to drive it low when neither the master nor the slave are driving. Although the embodiments described below are in the context of logic resulting from biasing DATA to logical low, the techniques may be adapted as necessary to accommodate configurations in which DATA is biased high, such as by pull-up resistance. In one embodiment, TSI may accommodate operating clock speeds of approximately 60 MHz.

In the discussion that follows, aspects of suitable signaling protocols that may be implemented at a physical layer (PHY) or at an upper layer, such as a messaging layer, are explained in the context of a master circuit and a slave circuit. As such, the referenced master circuit may be any of the master circuits depicted in FIG. 1, including WLAN PHY master circuit 104, WLAN PHY master circuit 112, and MCI master circuit 128, or may be any other suitable master circuit in another embodiment. Likewise, the referenced slave circuit may be any of the slave circuits depicted in FIG. 1, including WLAN PHY slave circuit 106, WLAN PHY slave circuit 114, and MCI slave circuit 130, or may be any other suitable slave circuit. Further, messaging layers are described in reference to their corresponding master or slave circuit, and therefore may include baseband processor messaging layer 120, WLAN messaging layer 122, WLAN messaging layer 124, Bluetooth messaging layer 134, or any other suitable messaging layer. In yet other embodiments, it may be desirable to switch the master and slave roles.

By employing the techniques of this disclosure, signals exchanged between the master circuit and the slave circuit over CLK and DATA may be configured to provide communications having the desired properties discussed above. Either the master circuit or the slave circuit may initiate communication over TSI. The TSI may be configured to have an idle state in which the master circuit drives CLK to a logical low value and the slave circuit has control of DATA.

Figure 2:
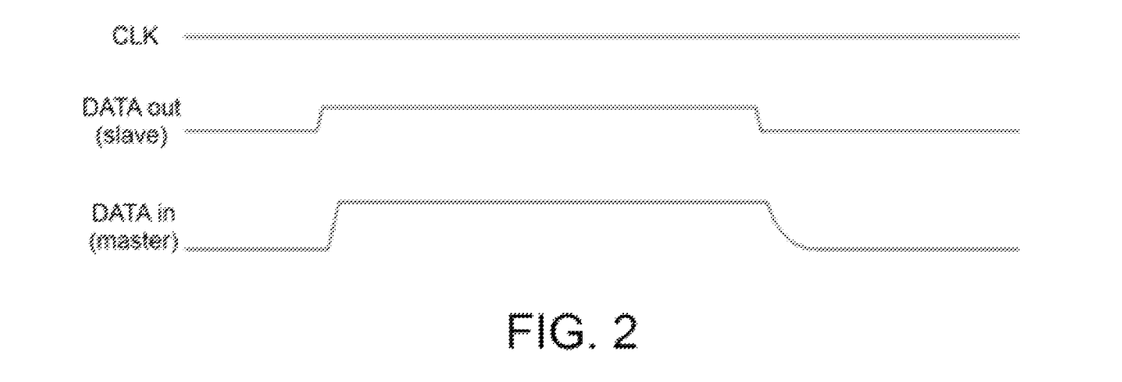
FIG. 2 schematically depicts signaling on a two-line serial interface initiated by a slave circuit, according to an embodiment of the invention.

The state of DATA while the master circuit is driving CLK low and while the slave circuit has control of DATA may be termed a slave assert (SL_ASSERT) signal. While idle, the slave circuit drives DATA low, deasserting SL_ASSERT. In one aspect, the slave circuit may initiate communication with the master circuit in real time by driving DATA at a logical high to assert SL_ASSERT as shown in FIG. 2. The TSI may be configured so that the slave circuit does not actively drive DATA low during the idle state to reduce the possibility of bus contention, and drives DATA low by allowing it to be driven low by the pull-down resistance as indicated. When the master circuit detects DATA at high and is not providing a timing signal on CLK, the master circuit may be configured to treat this signal pattern as a request for messaging exchange initiated by the slave circuit. As will be described below, the master circuit may attach a specific interpretation to the SL_ASSERT and respond in a desired manner based upon configuration of the message layer. In general, the slave circuit maintains control of DATA until a rising edge of a clock signal is detected on CLK indicating a communication is incoming from the master circuit. Thus, the slave circuit may keep SL_ASSERT asserted until detection of the clock signal. However, the slave circuit may also drive DATA low independently to deassert the signal and reset the interface.

In another aspect, the master circuit may initiate communication with, or respond to, the slave circuit by providing a clock signal on CLK. The slave circuit may be configured to continuously monitor CLK and release control of DATA at the first rising edge of the clock signal sent on CLK. Communications sent by the master circuit may include bus commands for write and read operations.

Figure 3:
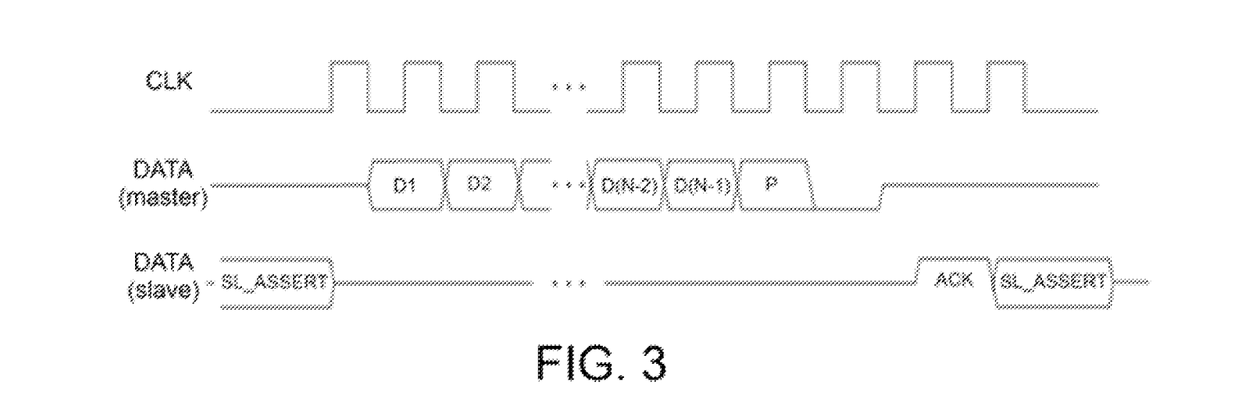
FIG. 3 schematically depicts signaling on a two-line serial interface corresponding to a write command, according to an embodiment of the invention.
Figures 4, 5:
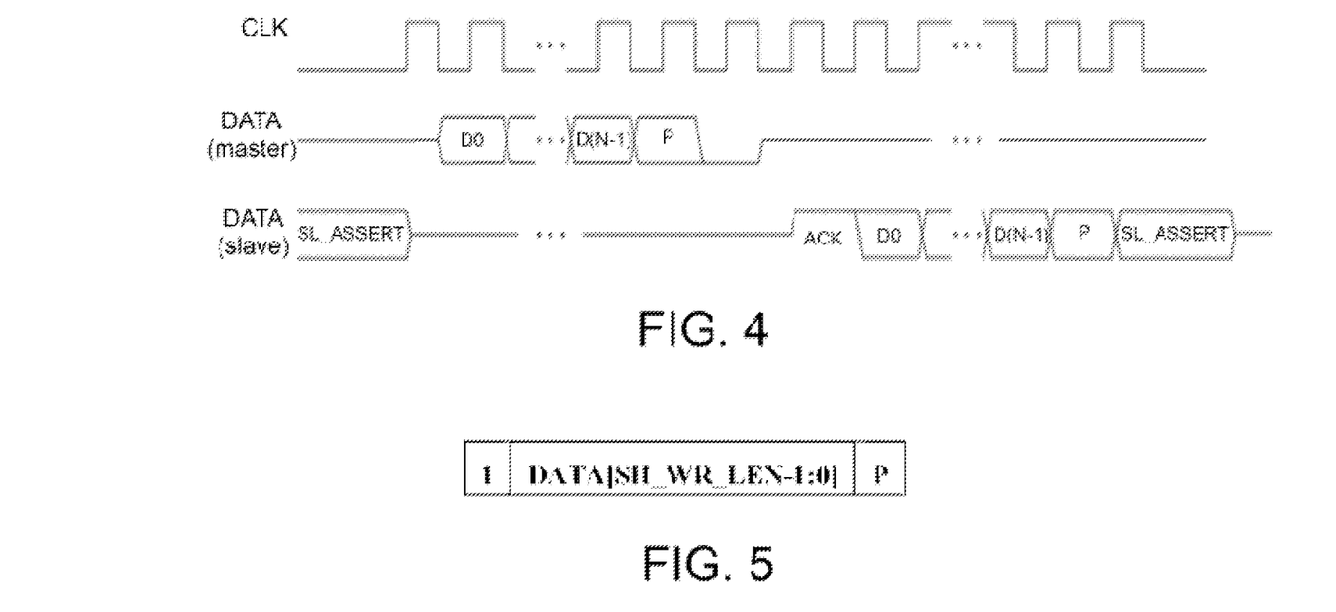
FIG. 4 schematically depicts signaling on a two-line serial interface corresponding to a read command, according to an embodiment of the invention.
FIG. 5 schematically depicts a short write frame, according to an embodiment of the invention.

The transition of control of DATA between the master circuit and the slave circuit may be termed a bus handover. As shown in FIGS. 3 and 4, read and write bus commands include two bus handover events, once in the beginning when the slave circuit releases control of DATA to the master circuit upon detection of the clock signal on CLK, and once after termination of the message sent by the master circuit, so that the slave circuit may transmit an ACK.

One example of a bus write command sent by the master circuit is depicted in FIG. 3. As shown, the TSI initially may be in the idle state, with the slave circuit having control of DATA, allowing for selective SL_ASSERT signaling. After starting the clock signal on CLK, the master circuit starts driving DATA at the first falling edge of CLK and at every subsequent falling clock edge to send an N-bit message, comprising the sequence of N bits D0, D1, ..., D(N−1). In turn, the slave circuit releases control of DATA at the first rising edge of CLK and may sample DATA at the second rising edge of CLK and at every subsequent rising edge. Following the N-bit message, the master circuit may send a parity bit P for error detection. The parity bit may be even and may be followed by a 0 bit for an additional clock cycle as shown. Based upon the data that is being driven by the master circuit and the PHY framing protocol described below, both the master circuit and the slave circuit may determine at which clock cycle the communication will terminate and the master circuit will stop driving DATA. At the termination point, the slave circuit may retake control of DATA to send an acknowledgment message, such as an acknowledgment (ACK) bit set by driving DATA high for one clock cycle from the rising edge of CLK. The master circuit may be configured to supply the clock signal on CLK for a period of time sufficient for the slave circuit to perform the acknowledgement. Upon receipt of the ACK, the master circuit may then drive CLK low to allow the TSI to return to idle state. As described above, the slave circuit may be considered to have control of DATA under the idle state, allowing real time signaling and initiation of communication through the SL_ASSERT functionality. In some embodiments, asserting SL_ASSERT may indicate a request for a control signal from the master circuit, such that the master circuit may respond to a SL_ASSERT assertion with a bus write command having a predetermined type of information.

Similarly, one example of a bus read command is depicted in FIG. 4. The TSI may initially be in the idle state, with the slave circuit having control of DATA to provide the SL_ASSERT signal. In some embodiments, the master circuit may be configured to respond with a read command when the slave circuit drives SL_ASSERT high. The master circuit may also initiate the read command with the TSI in the idle state when the slave circuit is driving DATA low. As in the write operation described above, the master circuit begins sending a clock signal on CLK. Upon detection of the first rising edge, the slave circuit relinquishes control of DATA, deasserting SL_ASSERT. The master circuit then sends an N-bit message (D0 through D(N−1)), starting at the second rising edge of CLK and ending with the parity bit P. Again, the slave circuit acknowledges the message from the master circuit with an ACK, and then sends the requested information in the form of an N-bit message. The length of the message sent by the slave circuit in response to the read command determined either from the read command itself or from preamble information in the message sent by the slave circuit. The master circuit may continue to supply the clock signal on CLK for an appropriate period corresponding to the message being sent from the slave circuit. The slave circuit may terminate the message with a parity bit P. As shown, after the master circuit stops sending the clock signal, the TSI returns to the idle state.

Further, the master circuit may send sequential bus commands without requiring additional coordination. The master circuit may begin sending the next command after the last clock cycle of the last command, maintaining the clock signal on CLK. The slave circuit may briefly assume control of DATA following sending an ACK in response to a write command or the parity P bit following the slave circuit's response to a read command. However, the slave circuit may then detect a rising edge of the clock signal on CLK and return control to the master circuit.

As described above, the master circuit may drive DATA low for one clock cycle following the parity bit to help ensure that an ACK sent by the slave circuit is properly detected. The ACK bit transmission helps the master circuit confirm that the slave circuit is properly in synchronization. Since the pull-down resistance drives DATA low, the master circuit may interpret the lack of a high ACK bit at the expected time as an error condition, as described below. This condition may be signaled to the messaging layer of the master circuit, so that error recovery may be implemented as desired.

In another aspect, the sample timing of DATA may be configured to accommodate the physical characteristics of the TSI as implemented. For example, propagation time over the interface may influence timing. Synchronous data transmitted by the slave circuit on the rising edge of the clock signal (CLK). As long as the total signal propagation time of the clock signal from the master circuit to the slave circuit and the propagation time of the data from the slave circuit to the master circuit is less than a clock period minus setup time, the master circuit may correctly sample DATA on the next rising edge of the clock. However, as propagation time increases, it may be desirable to provide the master circuit with programmable or otherwise adjustable read sampling delay to compensate for such delays. In one embodiment, a read sampling delay may be programmable in one-half clock cycle increments with, e.g., a maximum delay of at least one full clock cycle, which may be two full clock cycles from the reference rising edge.

Information exchanged between the master circuit and the slave circuit, save for the SL_ASSERT assertion, may be organized into frames having specific formats. These formats may be configured to provide transmission of different amounts of information at different latencies and may be used in different operating contexts, as desired. Further, a frame format may include information being sent from the master circuit to the slave circuit for write operations and information being sent from the master circuit to the slave circuit followed by information being sent from the slave circuit to the master circuit for read operations. Generally, the frame includes a command prefix used to identify the frame type, followed by one or more length and/or data fields and may be concluded with the parity bit. A first bit of the command prefix may correspond to a first frame type, such that only one bit may be required to identify the first frame type. Longer command prefixes, defined by an initial bit having the opposite value of that used to identify the first frame type, may be used to identify other frame types. The number of bits in the command prefix may correspond to the number of different frame types implemented in the particular embodiment.

Returning to the exemplary embodiment depicted in FIG. 1, communications between baseband processor 102 and WLAN transceivers 108 or 116 may employ frame formats as described below.

One frame format may correspond to a bus write command for sending data frames of defined length with a reduced latency. The defined length may be established as a parameter of the TSI and configured as desired given the intended application. In one aspect, this format may be used to deliver a relatively short length message from the master circuit to the slave circuit and is termed a short write frame (SHORT_WR). The SHORT_WR frame may be configured to send a predefined amount of data from the master circuit to the slave circuit at the minimum latency allowed by the TSI and may have a format as depicted in FIG. 5. As shown, SHORT_WR frames may have a command prefix of one bit, here having the value of 1. By requiring only one bit for identification, the latency associated with identifying SHORT_WR frames may be reduced. No length field is provided, as the SHORT_WR frame has a defined length established by the short write length (SH_WR_LEN) parameter. The data payload is carried by the data (DATA) field follows the command prefix, having a length of SH_WR_LEN. The parity bit terminates the SHORT_WR frame.

In one aspect, WLAN slave circuit 106 or 108 may be configured to pass the data bits serially to WLAN messaging layer 122 or 124, respectively, as they are received for processing to provide minimal latency. As desired, the parity bit may be checked before processing by the messaging layer, or may processed without checking to further reduce the latency associated with this frame. WLAN slave circuit 106 or 108 may independently check the parity bit at PHY to determine whether to acknowledge the transmission.

Figure 6:
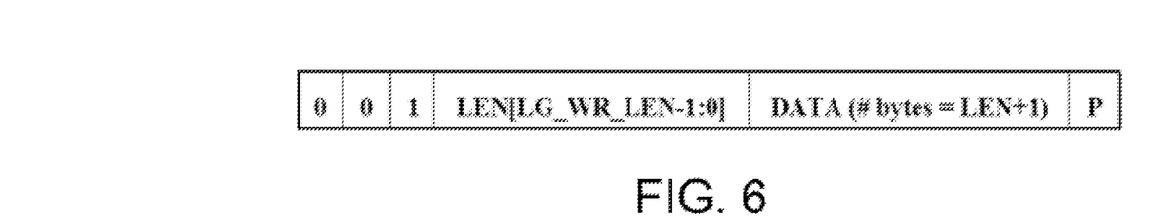
FIG. 6 schematically depicts a long write frame, according to an embodiment of the invention.

Another frame format may correspond to a bus write command for sending data frames of variable length from the master circuit to the slave circuit and may involve reduced latency. In one aspect, this frame may be termed a long write (LONG_WR) frame and may have a format as depicted in FIG. 6. As shown, LONG_WR frames may have a command prefix of three bits, having the value 0, 0, 1 in this example. The length (LEN) field is used to indicate the number of data bytes being sent. In one aspect, the value of the length field may be equal to the number of bytes minus 1. For example, a LEN value of 0 may be used to indicate 1 data byte. The number of bits in the length field is specified as a parameter, LG_WR_LEN. Following the LEN field, the DATA field carries the information being sent by the LONG_WR frame. A parity bit may terminate the frame.

Figure 7:
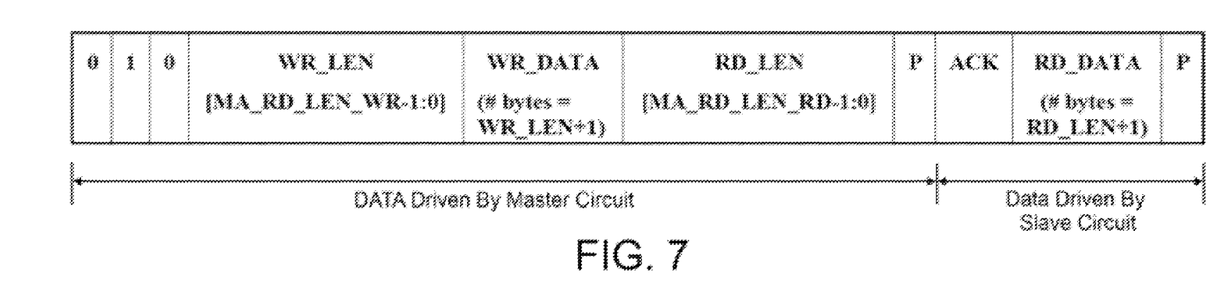
FIG. 7 schematically depicts a master read frame, according to an embodiment of the invention.

Yet another frame format may be used for a bus read command, allowing the master circuit to request information from the slave circuit, such as a register read. As such, information may be sent from the master circuit to the slave circuit to identify the information being requested, such as a register address. In return, the slave circuit may send the requested information. This format may be termed a master read (MASTER_RD) frame and may have a format as depicted in FIG. 7. As shown, a MASTER_RD frame may have a command prefix of three bits, here 0, 1, 0. Next, the write length (WR_LEN) field may contain the master read length write (MA_RD_LEN_WR) value indicating the number of bits in the length field for the write data portion of the frame. As described above, the length field value may be represented as the number of data bytes minus 1, so that the minimum number of data bytes that may be indicated is one. Following the WR_LEN field is the write data (WR_DATA) field, having the length specified in the WR_LEN field. Next, the master circuit sets a master read length read (MA_RD_LEN_RD) parameter corresponding to the amount of data that will be sent by the slave circuit in response to the read command in the read length (RD_LEN) field. The transmission from the master circuit is then terminated with a parity bit. In response, the slave circuit sends an ACK, followed by the requested data in the read data (RD_DATA) field, and a final parity bit. As described above, handover of the TSI may occur between the parity bit transmitted by the master circuit and the ACK transmitted by the slave circuit.

Figure 8:
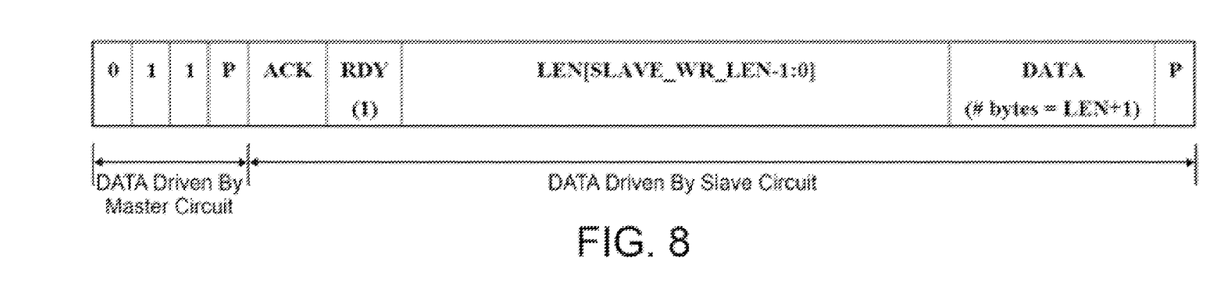
FIG. 8 schematically depicts a slave write frame having data, according to an embodiment of the invention.
Figure 9:
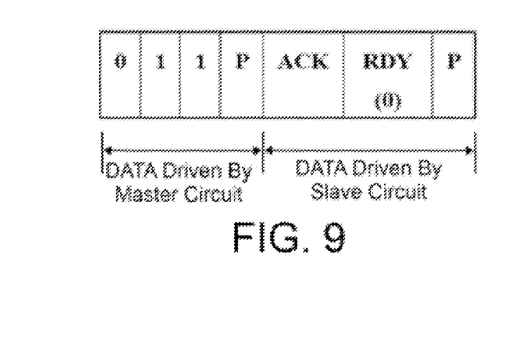
FIG. 9 schematically depicts a slave write frame without data, according to an embodiment of the invention.

Another frame format that may be used in the context of a read command for the transfer of information from the slave circuit to the master circuit may be termed a slave write (SLAVE_WR) frame, with some embodiments depicted in FIGS. 8 and 9. As described above, the master circuit may be configured to interpret an assertion of SL_ASSERT by the slave circuit as a bus request. In such embodiments, the master circuit may respond with a SLAVE_WR frame to coordinate transfer of information from the slave circuit. In both examples shown in FIGS. 8 and 9, the portion of the frame sent by the master circuit may be a three bit command prefix, which in this example is 0, 1, 1, followed by the parity bit. Since the SLAVE_WR frame may be used for transfer of data to the master circuit that is initiated by the slave circuit, no data need be sent by the master circuit. As such, bus handover may occur directly following the command prefix and the parity bit.

FIG. 8 shows a format that may be used when the slave circuit has data to transfer. In response to the command prefix, the slave circuit may send an ACK and a ready (RDY) bit set to a value indicating information will be transferred, such as 1. Next, the slave circuit uses the length (LEN) field to indicate the number of data bytes being sent, with the slave write length (SLAVE_WR_LEN) parameter specifying the amount of data that will be transmitted. In turn, the data (DATA) field contains the information and a parity bit may be used to terminate the frame.

Alternatively, FIG. 9 shows a format used when the slave circuit does not have data for transfer. In response to the command prefix sent by the master circuit, the slave circuit may respond with an ACK, a RDY bit set to a value indicating no data will be transferred, here 0, and a parity bit.

Figure 10:
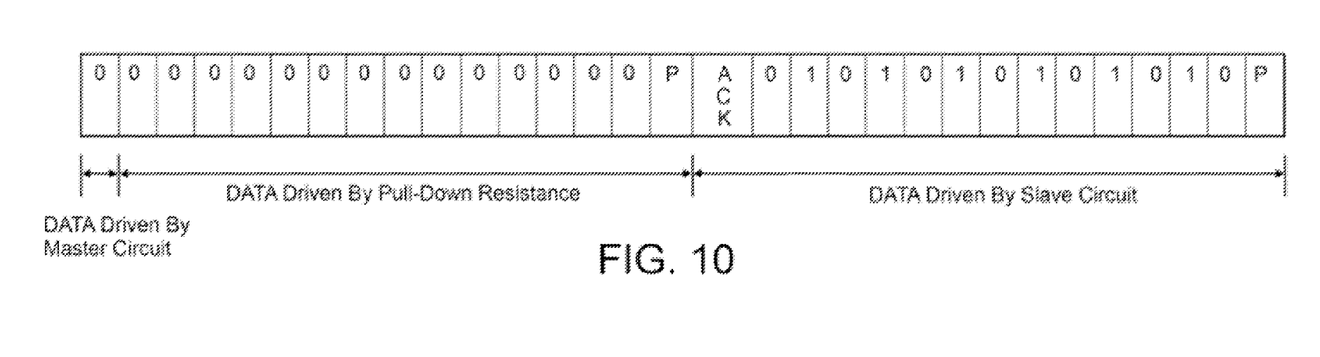
FIG. 10 schematically depicts a synchronization frame, according to an embodiment of the invention.
Figure 11:
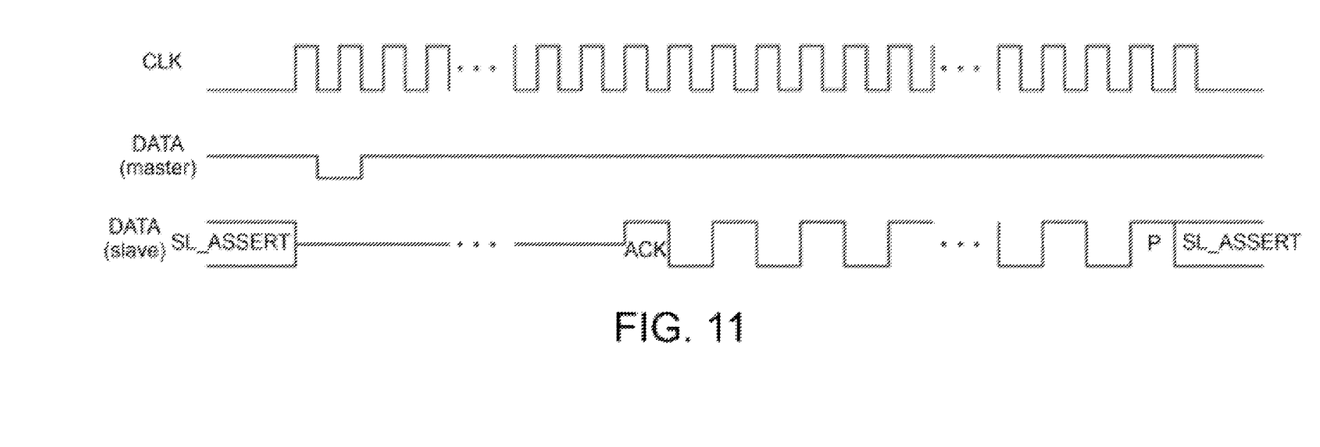
FIG. 11 schematically depicts signaling on a two-line serial interface corresponding to transmission of a synchronization frame, according to an embodiment of the invention.

Additional frame formats may be provided for various other operations concerning the TSI. In one aspect, a synchronization frame may be used to establish or reestablish timing between the master circuit and the slave circuit. Such procedures may be desirable when errors occur in the bus handover. A suitable synchronization (SYNC) frame is depicted in FIG. 10. As shown, the master circuit may initiate the frame with a 15 bit command prefix. In this embodiment, the master circuit actively drives DATA low only for the first bit and the remaining portion of the command prefix is driven by the pull-down resistance. The parity bit following the command prefix may also be driven by the pull-down resistance. After receiving the command prefix, the slave circuit may respond with an ACK and a response pattern of alternating logical low and logical high values. In one aspect, the response pattern may be an odd number of bits, such as 13 in this example, so that the parity bit is odd to help distinguish the parity bits sent in the other contexts described above. FIG. 11 depicts signaling performed on CLK and DATA by the master circuit and the slave circuit during the transmission of the SYNC frame. Other bit lengths for the command prefix and the response pattern may be employed as warranted depending upon the application.

In a further aspect, the TSI may be configured to help reduce the possibility of a SYNC frame being detected erroneously. As desired, all data fields in the SHORT_WR, LONG_WR, and MASTER_RD frames sent from the master circuit to the slave circuit may be scrambled by an alternating pattern of logical high and logical low, starting with logical high. For example, this process may be performed by an XOR operation. The slave circuit may then descramble the data fields before supplying them to the messaging layer of the WLAN transceiver. By scrambling the data, a data field being sent by the master circuit that may otherwise have a string of logical low values sufficiently long to be misinterpreted as a SYNC frame will instead be sent having alternating logical values.

Figure 12:
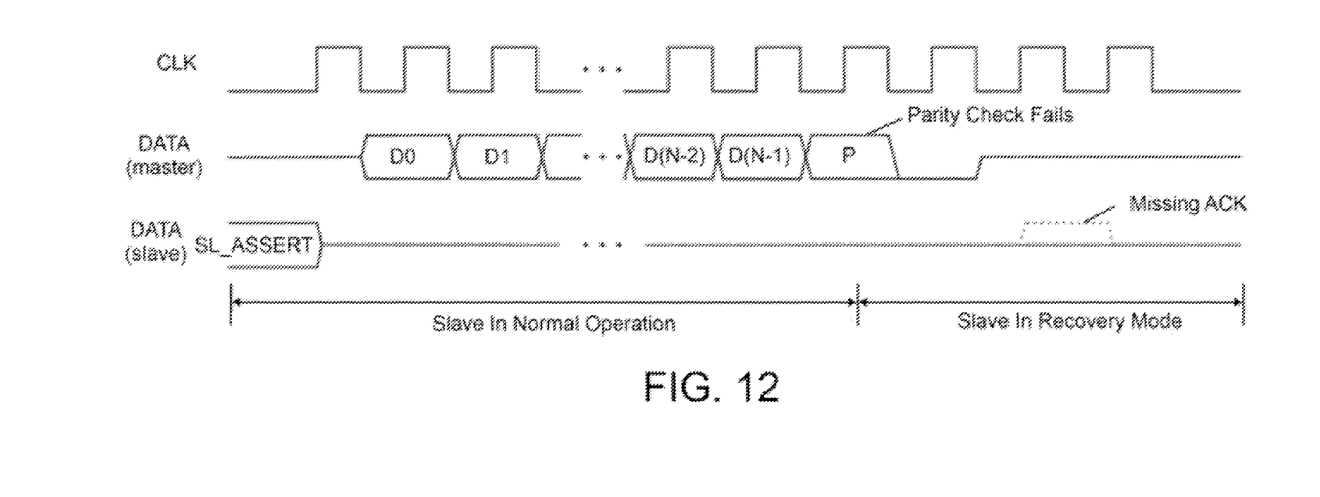
FIG. 12 schematically depicts signaling on a two-line serial interface corresponding to a recovery mode, according to an embodiment of the invention.

The TSI may also be configured to allow for robust error detection and handling. The slave circuit may detect errors when a parity check fails, when the bit following the parity bit sent by the master circuit is high, when an alert is sent by the messaging layer of the slave circuit, or by other suitable indications. The slave circuit may directly detect errors due to parity check failure or a mismatch in the bit following the parity bit without involvement of the messaging layer. In one aspect, the detection of a SYNC frame command prefix by the slave circuit may constitute an example of error detection, as the master circuit may be configured to transmit the SYNC frame command prefix when an error is detected by the master circuit. Upon detecting an error, the slave circuit may be configured to employ a recovery mode. In this mode, the slave circuit might not drive the DATA line so that the pull-down resistance drives it low and the slave circuit may respond only to the command prefix corresponding to a SYNC frame. In this condition, any ACK that may be expected by the master circuit may instead be received at logical low value since the pull-down resistance is driving DATA, signaling an error to the master circuit. An example of this signaling of the master circuit and the slave circuit regarding error detection and entry into recovery mode is depicted in FIG. 12. To regain communication, the master circuit may send the SYNC frame command prefix which the slave circuit is now awaiting. In the special case of error detection based on reception of the SYNC frame command prefix, the slave circuit may not need to explicitly enter recovery mode to receive a SYNC frame initiated by the master circuit as the command prefix has already been receiver. As described above, once the slave circuit has detected the command prefix of the SYNC frame, it may send the designated response pattern. After completing the SYNC frame, the slave circuit may return to normal operation in which it has control over DATA to selectively assert SL_ASSERT or may receive command prefixes for other frames initiated by the master circuit.

In some embodiments, from the perspective of the master circuit, errors may be detected when a parity check fails, when an ACK dictated by a given frame format is missed, when an alert is sent by the messaging layer of the master circuit, or by other suitable indications. The master circuit may directly detect errors due to parity check failure or a missing ACK without involvement of the messaging layer. Upon detection of an error by the master circuit, the master circuit may perform a recovery operation involving the sending of a SYNC frame. Correct operation may then be confirmed if the slave circuit returns the expected response pattern with the appropriate timing.

Figure 13:
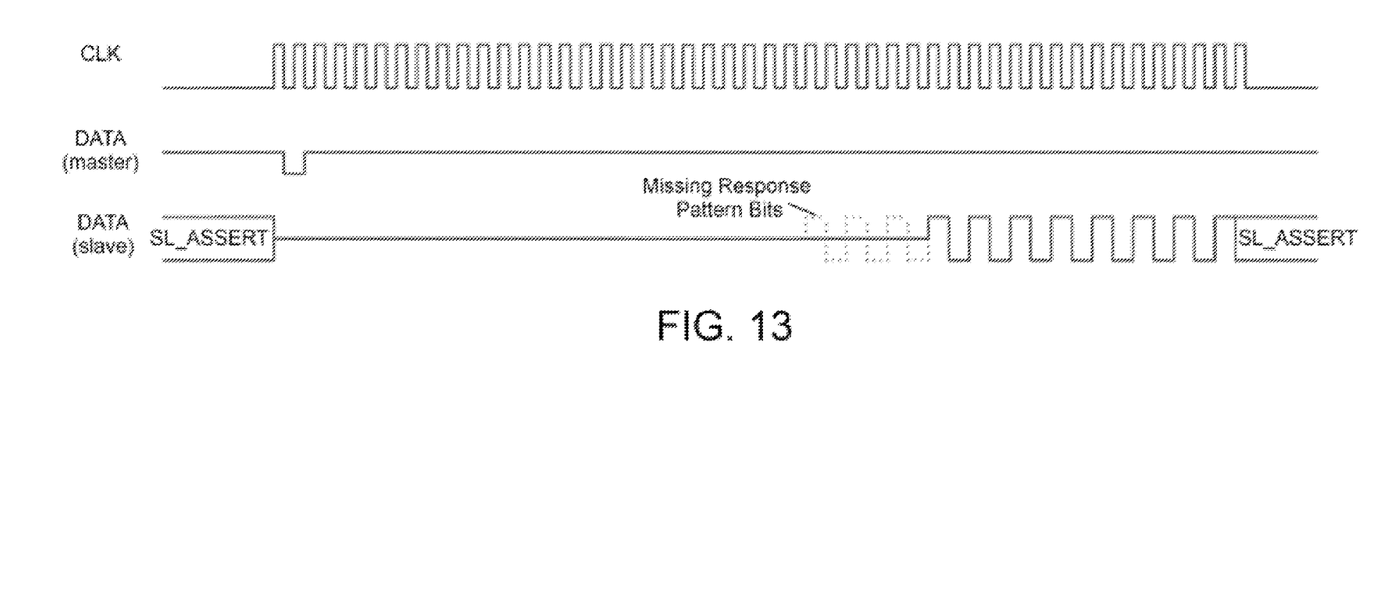
FIG. 13 schematically depicts signaling on a two-line serial interface corresponding to an error recovery operation involving a synchronization frame, according to an embodiment of the invention.

However, if the slave circuit fails to respond with the pattern, the master circuit may continue to provide the clock signal on CLK while allowing the pull-down resistance to drive DATA at the logical low. This pattern is the equivalent of the command prefix of the SYNC frame, so the slave circuit may be expected to eventually recognize the prefix and provide the response pattern to complete the SYNC frame. While continuing to supply the clock signal, the master circuit may monitor DATA to search for the response pattern sent by the slave circuit. Upon detection of the correct SYNC response pattern on the DATA line, the master circuit may immediately drive CLK low to lock the correct synchronization timing. An example of the signaling of the master circuit and the slave circuit corresponding to this response pattern search is depicted in FIG. 13. Normal communication according to the frame formatting described above may resume after the SYNC frame is completed. Further, since the master circuit is monitoring DATA during this recovery process, it may determine a correct SYNC frame not only upon the receipt of the designated response pattern, but also upon a confirmation that DATA was low for the appropriate period corresponding to the command prefix preceding the received response pattern. Any logical high values on DATA occurring during the period corresponding to the command prefix may be attributable to the slave circuit driving DATA at that time and correspondingly be taken as an indication that the response pattern is erroneous, requiring a continuation of the recovery process. In some embodiments, depending on the programmed read sample timing discussed above, the latency in detecting the SYNC response pattern might be too large for the master circuit to stop the clock signal on CLK in the time specified by the SYNC frame format. When such conditions exist, the master circuit may be configured to detect the response pattern based on all but the terminal bit.

In addition to the frame formats employed by the TSI, application specific operation may be controlled as desired by the respective messaging layers, such as at messaging layer 120 in baseband processor 102 and WLAN messaging layer 122, WLAN messaging layer 124 or Bluetooth messaging layer 134 in the respective transceivers. In one aspect, the messaging layer of the transceiver may make the determination to assert SL_ASSERT in order to request access to the bus. This may include the messaging layer determining there is information to transmit to the master circuit. In another aspect, messaging layer 120 may determine whether to grant access to the TSI, such as by sending a SLAVE_WR frame. In turn, if the messaging layer of the transceiver does not receive a SLAVE_WR frame, the transceiver messaging layer may make a determination to wait and maintain assertion of SL_ASSERT or deassert. In yet another aspect, upon receipt of the SLAVE_WR message, the transceiver messaging layer may send the data to the master circuit and then deassert SL_ASSERT.

Further operations that may be performed at the messaging layer include application specific features provided by the TSI. Examples include providing a clock signal used by the master circuit to establish the operating frequency of the interface, defining any application specific message formats to be sent using designated frame types, establishing frame parameter values to be used by the TSI, and other suitable higher level features. The following aspects of the TSI are described in the context of the control of a WLAN transceiver, as exemplified by wireless communications device 100. However, different parameters, formats and functions may be adapted to the intended application as warranted. In one aspect, the messaging layers associated with a WLAN transceiver may be configured to implement a burst mode, as described below.

In one embodiment, the TSI as applied to WLAN transceivers 108 or 116 may include the use of 60 MHz, 48 MHz, 40 MHz and 30 MHz, for example. One suitable target speed is approximately 60 MHz, but a speed of approximately 48 MHz may be used as a fall back option. Addition frequencies, such as 40 MHz and 30 MHz, may be supplied as desired for debug purposes.

In the WLAN transceiver context, an important control feature may be the capability to quickly adjust gain in the receive path in response to detection of RF saturation. Accordingly, this aspect of WLAN transceiver control may be associated with the reduced latency provided by the SHORT_WR frame. Further, the slave circuit may use the SL_ASSERT functionality to signal an RF saturation condition to the master circuit to request a corresponding receive gain adjustment.

As discussed above, various parameters may be established for the frame formats to achieve a desired level of functionality regarding the control of a WLAN transceiver. For example, the SH_WR_LEN parameter may be limited to approximately 9 bits to provide reduced latency. This message length may provide a suitable resolution to specify appropriate receive gain adjustment that may be stored in a look up table by the WLAN transceiver. This bit length may also be sufficient for other messaging functions employing the SHORT_WR frame described below. Further, the LG_WR_LEN may configured to provide 16 bits for identification of a register address and 16 bits for the data payload. In addition, the MA_RD_LEN_WR, MA_RD_LEN_RD and SL_WR_LEN parameters may have a length corresponding to 16 bits, providing the necessary register address and data payloads, respectively.

With regard to the SHORT_WR frame, additional frame identification may be performed at the messaging layer to distinguish possible control messages. For example, control messages for a WLAN transceiver employing the SHORT_WR frame type may be 9 bits in length as noted above. A variable length command prefix (positioned immediately subsequent to the command prefix of the PHY) of 1, 2, or 4 may be followed by variable amount of data as required by the usage. Any remaining unused bits may be padded with 0's. By utilizing a variable length command prefix, priority may be given to control messages according to latency requirements. As discussed above, it may be desirable to configure the frame format to associate receive (Rx) gain commands with the lowest latency, having a one bit command prefix. Transmission (Tx) enable commands may have the next lowest latency requirement and be assigned with a two bit command prefix. Additional WLAN transceiver control messages may be associated with relaxed latency requirements and may be implemented using a four bit command prefix. In one embodiment, SHORT_WR frames may have the formats indicated in Table 1.

TABLE 1

| Control Message | Command Prefix | | | | Data |
| --- | --- | --- | --- | --- | --- |
| Rx Gain | 1 | | | | 6 bit gain index |
| Tx Enable | 0 | 1 | | | None |
| Clock Enable | 0 | 0 | 0 | 0 | XO enable bit and XO source select bit |
| Tx Disable | 0 | 0 | 0 | 1 | None |
| Tx Gain | 0 | 0 | 1 | 0 | 5 bit gain index |
| RF Reset | 0 | 0 | 1 | 1 | None |

As described above, the contents of a SHORT_WR frame may be passed by the slave circuit directly to the messaging layer as each bit is received to reduce latency. Further, the messaging layer may apply any control settings delivered by the SHORT_WR frame without waiting for the parity check provided by the terminating parity bit. In one embodiment, this policy may be applied to functions having the lowest latency tolerance, such as the receive gain adjustment and the transmission enable. Other commands, such as RF reset and clock enable, may await the parity check to avoid erroneous execution.

In another aspect, it may be desirable for the WLAN transceiver to provide a burst write mode allowing for increased register write speed for sequential sets of addresses, which is often used for memory filling. A burst write may be initiated with a normal register write to the starting address location. Subsequent register writes may use a modified format of the LONG_WR frame with a LEN field set to 1 to provide 16 bits to accommodate the data payload, without requiring address information since the address may be established by the previous operation. Accordingly, the slave circuit may interpret a LONG_WR frame without the address field as an indication to write the data payload to a sequential address location. In one embodiment, eliminating the address field may increase the throughput from approximately 22 Mbps, as may be achieved using normal register writes, to approximately 35 Mbps using the burst write mode. Further, the master circuit may initiate the burst write mode automatically without requiring control from the messaging layer by detecting register writes to sequential addresses.

Similarly, a burst read mode may be initiated by a normal register read at a given starting address location. All subsequent sequential address reads may use the SLAVE_WR frame type instead, since no address needs to be passed from the master circuit to the slave circuit. The master circuit may initiate the burst read mode automatically without messaging layer involvement based on the addresses of the register reads.

In yet another aspect, the frame formats described above may be adapted for use with WLAN transceivers employing multiple receive chains. For example, receive gain control messages for two chains may be expressed as a delta of one relative to the other. The delta value may be relatively small because it may not be desirable for the difference between the two receive chains to exceed approximately 15 dB. In one embodiment, an approximately 4 bit delta value may be used to designate the delta at a resolution of 2 dB. This modification may include increasing the SH_WR_LEN parameter to 10 bits. In another embodiment, both receive chain gains may be expressed as delta values, by associating specific values with special meanings, such as an initial gain setting and saturation step. Although this may limit the range of delta values that may be expressed, the resulting reduction in latency may warrant the compromise. Under this implementation, a SH_WR_LEN parameter to 9 bits may be used to specify a delta range of approximately −28 dB to +30 dB, which may be suitable for most applications.

In further embodiments, it may desirable to provide specific clock frequencies to a WLAN transceiver for calibration. When the WLAN transceiver does not include a frequency source capable of generating the frequencies, the master circuit may be used to supply the required clock frequency over the TSI. Since such calibration may not constitute part of the normal communication between the master circuit and the slave circuit, the respective messaging layers may coordinate operation. For example, the master circuit may be employed to source an 80 MHz or a 120 MHz clock signal to the slave circuit. In one embodiment, the master circuit may send an RF calibration clock enable (RF Cal Clock Enable) message to the slave using a SHORT_WR frame. Upon receipt of this message, the slave circuit may enter the recovery mode after sending an ACK, releasing control of DATA. At this point, the messaging layer of the master circuit may control DATA and drive it high. The baseband processor messaging layer may be driving CLK at the frequency associated with the calibration routine. The slave circuit may be in recovery mode and may ignore the activity on CLK activity because DATA is maintained high and therefore does not present a SYNC frame command prefix. The messaging layer of the WLAN transceiver may then pass the calibration clock signal from CLK to the appropriate calibration logic. Upon termination of the calibration routine, the baseband processor messaging layer drives CLK low and releases control of DATA, so that it may be driven low by the pull-down resistance. Normal operation of TSI may be reinstated though use of the SYNC frame, as described above.

Examples of suitable messages and corresponding frame format that may be used in the control of a WLAN transceiver are listed in Table 2.

TABLE 2

| Message | Frame Type | Description |
| --- | --- | --- |
| RF Reset | SHORT_WR | Resets RFIC (not just the interface) |
| Clock Enable | SHORT_WR | Enables XO clock and selects XO source. |
| Tx Enable | SHORT_WR | Enables Tx mode. |
| Tx Disable | SHORT_WR | Disables Tx mode. |
| Rx Gain | SHORT_WR | Rx gain command (sent as an index) |
| Tx Gain | SHORT_WR | Tx gain command (sent as an index) |
| RF Register Write | LONG_WR | RF register write |
| RF Register Read | MASTER_RD | RF register read |
| Burst RF Write | LONG_WR | Used for bursting RF register writes. |
| Burst RF Read | SLAVE_WR | Used for bursting RF register reads. |

In addition, examples of latencies associated with the messaging formats described above that may be achieved while operating the TSI at 60 MHz are shown in Table 3.

TABLE 3

| Message | # Clocks | Duration | Notes |
| --- | --- | --- | --- |
| RF Reset | 11 | 184 ns | |
| XO Disable | 11 | 184 ns | |
| Tx Mode | 4 | 67 ns | Does not include antenna diversity selection or parity check. |
| Rx Gain | 8 | 134 ns | Does not include parity check. |
| Tx Gain | 9 | 150 ns | Does not include parity check. |
| RF Cal Clock Enable | 11 | 184 ns | |
| RF Register Write | 42 | 700 ns | |
| RF Register Read | 43 | 717 ns | |
| Burst RF Write | 26 | 434 ns | |
| Burst RF Read | 27 | 450 ns | |

As noted above, the TSI may also be configured for communication of coexistence information regarding other wireless protocols. In the context of wireless communications device 100 shown in FIG. 1, TSI 132 may provide communication between baseband processor 102 and Bluetooth transceiver 126. In one embodiment sufficient MCI communication may be implemented using the LONG_WR and SLAVE_WR frame formats described above. Messages sent from MCI master circuit 128 to MCI slave circuit 130 may use the LONG_WR frame type and messages sent from MCI slave circuit 130 to MCI master circuit 128 may use the SLAVE_WR frame type. In one embodiment, the LG_WR_LEN parameter may be configured based on 3 bits for the command prefix, 5 bits for the LEN field, the data payload, and one bit each for parity, ACK and turnaround. Similarly, the SL_WRLEN parameter may be configured based on 3 bits for the command prefix, one bit each for ACK and parity, 5 bits for the length field, the data payload, and one bit each for parity and turnaround. For example, each parameter may include a header of one byte, a 16 byte payload and a one by checksum, for a total of 18 bytes. To further reduce latency, one or more MCI messages may be mapped to a SHORT_WR frame.

Figure 14:
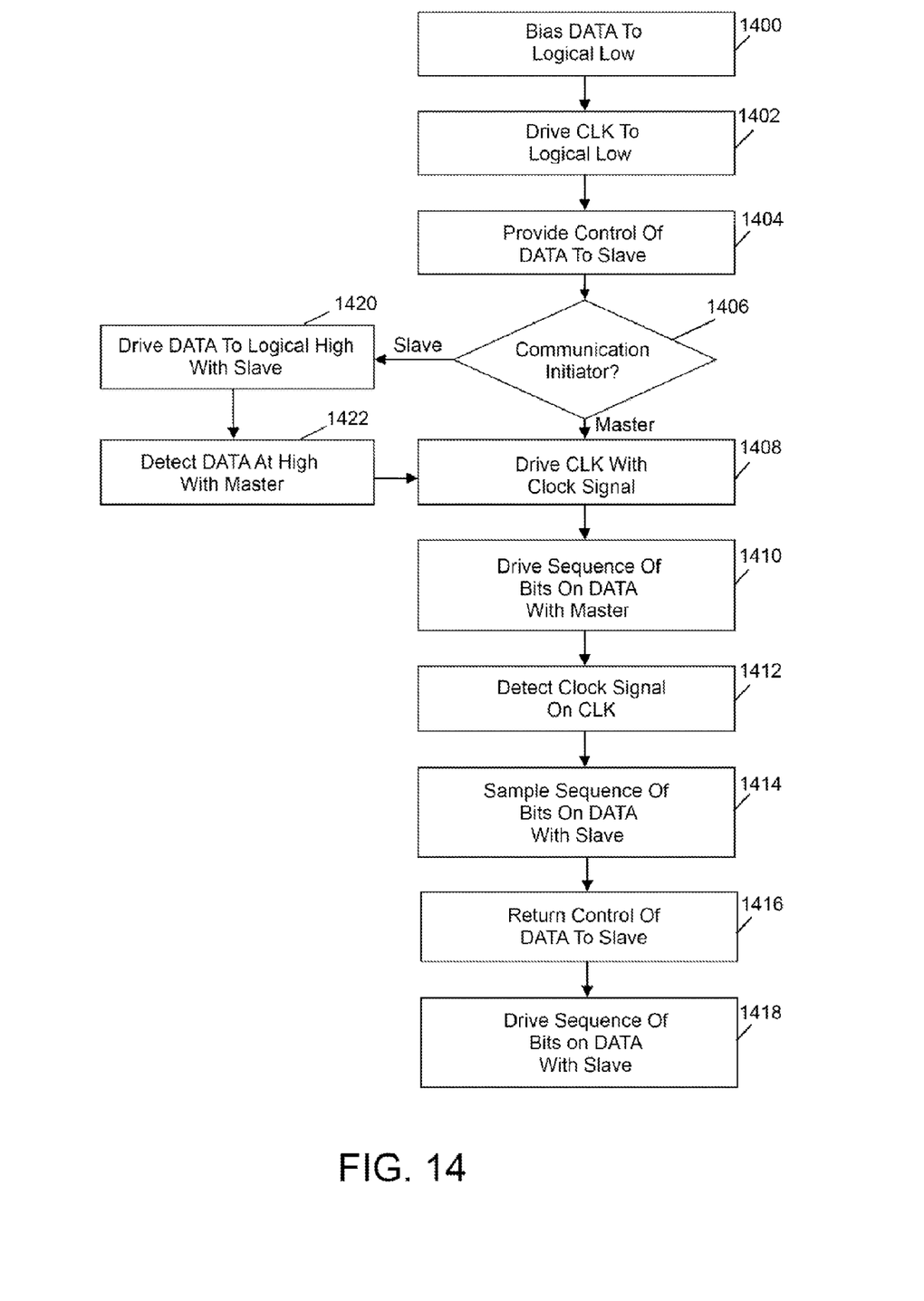
FIG. 14 is a flowchart representing a routine for communicating using a two-line serial interface, according to an embodiment of the invention.

Specific examples of MCI messages are listed in Table 4, with regard to communication between the respective hardware (HW) and software (SW) portions of baseband processor 102 and Bluetooth transceiver 120, including the media access control (MAC) layer of baseband processor 102, the link control (LC) layer of Bluetooth transceiver, memory (MEM) and registers (REG). LTE messages may be assigned a specific header, such as 0xD0 in this example, and be passed from between the master circuit and the slave circuit without modification.

then transmit a first sequence of bits on DATA in 1410. In one aspect, the first sequence may be either all or a portion of one of the frames defined by the TSI protocol, depending on whether the frame format include return data sent by the slave circuit. In turn, the slave circuit may detect the clock signal on CLK in 1412 and sample the first sequence of bits in 1414. Following transmission of the first sequence of bits, the master circuit may return control of DATA to the slave circuit in 1416. Depending upon the frame format specified by the first sequence of bits, the TSI may either return to idle or may continue to 1418 so that the slave circuit may transmit a second sequence of bits on DATA to complete the frame.

Alternatively, 1406 indicates that for communications initiated by the slave circuit, the routine may branch to 1420 such that the slave circuit may have control of DATA and signal the master circuit in real time by driving DATA to a second logical value, such a logical high. The master circuit may detect DATA being driven to the second logical value in 1422 to assert SL_ASSERT and the routine may then return to 1408 for the master circuit to drive the clock signal on CLK and then transmit the first sequence of bits in 1410. As described above, the first sequence of bits may be a predetermined response to assertion of SL_ASSERT.

The embodiments described above are provided for illustration only and should not limit any aspect of other embodi-

TABLE 4

| Header | Name | Length(Byte) | Source | Destination | Worst Case Tx time (µs) |
|---|---|---|---|---|---|
| 0x00 | Reserved | — | N/A | N/A | N/A |
| 0x10 | MCI_LNA_BT_LOCK (MCI_LNA_CTRL) | 0 | HW(LC) | HW(MAC) | 0.317 |
| 0x20 | MCI_CONT_NACK | 0 | HW(MAC) | HW(LC) | 0.333 |
| 0x30 | MCI_CONT_INFO | 4 | HW(LC) | HW(MAC) | 0.850 |
| 0x40 | MCI_CONT_RST | 0 | HW(LC) | HW(MAC) | 0.317 |
| 0x50 | MCI_SCHD_INFO | 16 | SW | MEM | 2.467 |
| 0x60 | MCI_CPU_INT | 4 | SW | REG | 0.867 |
| 0x70 | MCI_SYS_WAKING | 0 | HW | HW | 0.333 |
| 0x80 | MCI_GPM | 16 | SW | MEM | 2.467 |
| 0x90 | MCI_LNA_INFO | 1 | HW(MAC) | HW(LC) | 0.467 |
| 0x94 | MCI_LNA_BT_INFO MCI_LNA_STATE | 1 | HW(LC) | HW(MAC) | 0.450 |
| 0x98 | MCI_LNA_WLAN_PASS (MCI_LNA_TAKE) | 1 | HW(MAC) | HW(LC) | 0.467 |
| 0x9C | MCI_LNA_WLAN_SEIZE (MCI_LNA_TRANS) | 1 | HW(MAC) | HW(LC) | 0.467 |
| 0xA0 | MCI_SYS_SLEEP | 0 | HW | HW | 0.333 |
| 0xC0 | MCI_SYS_WAKE | 0 | SW | HW | 0.333 |
| 0xD0 | LTE | 1 | HW | HW | 0.467 |
| 0xFE | MCI_DEBUG | 4 | LC | NONE | 0.850 |
| 0xFF | MCI_REMOTE_RESET | 16 | SW | HW | 2.467 |

To help illustrate aspects of the disclosure, an exemplary routine for communicating between a master circuit and a slave circuit coupled by the TSI is represented by the flowchart depicted in FIG. 14. Beginning with 1400, the interface may be configured to bias one of the lines, DATA, to a first logical value when the line is not being driven by the master circuit or the slave circuit. As described above, this may be achieved by using pull-down resistance. In a bus idle condition, the master circuit may drive the second line, CLK, at one value, such as logical low, instead of providing a clock signal, as represented by 1402. Under these conditions, 1404 indicates that the slave circuit may have control of DATA.

The routine may branch depending on whether communications are initiated by the master circuit or by the slave circuit as indicated in 1406. For communications initiated by the master circuit, the routine may proceed directly to 1408 and the master circuit may drive a clock signal on CLK and ments. For example, the TSI may be utilized in any application and wireless communications device 100 is provided as a representative only. Accordingly the embodiments described herein are presently only some embodiments of the invention. One skilled in the art that pertains to the present invention will understand that the principles of this disclosure can be extended easily to other embodiments.

What is claimed is:

1. A method for communication between a master circuit and a slave circuit through a two-line interface including a first line and a second line, comprising:
    biasing the first line to a first logical value when the first line is not being driven by the master circuit and is not being driven by the slave circuit;
    driving the second line at the first logical value by the master circuit;
    providing the slave circuit with control of the first line;

driving a clock signal on the second line by the master circuit;

driving a first sequence of bits on the first line by the master circuit;

detecting the clock signal by the slave circuit; and sampling the first sequence of bits by the slave circuit.

2. The method of claim 1, further comprising determining a length and identity of a command of the first sequence at the slave circuit based on a value of a command prefix.

3. The method of claim 2, wherein the first sequence of bits comprises a data field following the command prefix, the data field having a predefined number of data bits.

4. The method of claim 2, wherein the first sequence of bits comprises a length field and a data field following the command prefix, the length field specifying a number of data bits in the data field.

5. The method of claim 2, further comprising returning control of the first line to the slave circuit after driving the first sequence of bits.

6. The method of claim 5, further comprising driving a second sequence of bits on the first line by the slave circuit after returning control of the first line to the slave circuit.

7. The method of claim 1, further comprising driving the first line to a second logical value by the slave circuit before driving the clock signal on the second line; and detecting the second logical value on the first line by the master circuit, wherein the master circuit drives the clock signal on the second line upon detecting the second logical value.

8. The method of claim 7, wherein the first sequence of bits comprises a command prefix consisting of one bit and a data field following the command prefix, the data field having a predefined number of bits.

9. The method of claim 1, further comprising detecting an error by the master circuit before driving the first sequence of bits, wherein the first sequence of bits comprises a command prefix having a first bit driven at the first logical value by the master circuit and a plurality of successive bits driven at the first logical value from the first line bias.

10. The method of claim 9, further comprising:

determining a length and an identity of a command by the slave circuit based on a value of the command prefix;

returning control of the first line to the slave circuit after driving the first sequence of bits; and driving a second sequence of bits on the first line by the slave circuit, the second sequence of bits having a predefined pattern.

11. The method of claim 10, further comprising detecting the predefined pattern by the master circuit, wherein driving the second line at the first logical value is based on detecting the predefined pattern.

12. The method of claim 1, wherein driving the first sequence of bits comprises:

driving a command prefix, driving a data field following the command prefix, and driving a receive gain adjustment between the master circuit implemented in a baseband processor of a wireless communications device and the slave circuit implemented in a wireless transceiver.

13. The method of claim 12, further comprising driving the first line to a second logical value by the slave circuit before driving the clock signal on the second line and detecting the second logical value on the first line by the master circuit, wherein the master circuit drives the clock signal on the second line based on detection of the second logical value.

14. The method of claim 13, further comprising detecting a radio frequency (RF) saturation condition by the wireless transceiver, wherein the slave circuit drives the first line to the second logical value in response to the detection.

15. The method of claim 1, wherein driving the first sequence of bits comprises driving a coexistence message between the master circuit implemented in a baseband processor of a wireless communications device and the slave circuit implemented in a Bluetooth transceiver.

16. A serial communications interface comprising:

a master circuit;

a slave circuit;

a first line between the master circuit and the slave circuit; and a second line between the master circuit and the slave circuit, wherein the interface to bias the first line to a first logical value when the first line is not being driven by the master circuit and is not being driven by the slave circuit;

wherein the master circuit to selectively drive the second line by one of a clock signal and the first logical value;

wherein the slave circuit to control the first line when the master circuit is driving the second line at the first logical value;

wherein the master circuit to transmit a first sequence of bits to the slave circuit on the first line after driving the clock signal on the second line; and wherein the slave circuit to sample the first sequence of bits after detecting the clock signal on the second line.

17. The serial communications interface of claim 16, wherein the slave circuit further to determine a length and an identity of a command of the first sequence of bits based on a value of a command prefix.

18. The serial communications interface of claim 17, wherein the first sequence of bits comprises a data field following the command prefix, the data field having a predefined number of data bits.

19. The serial communications interface of claim 17, wherein the first sequence of bits comprises a length field and a data field following the command prefix, the length field specifying a number of data bits in the data field.

20. The serial communications interface of claim 17, wherein the master circuit further to return control of the first line to the slave circuit after driving the first sequence of bits.

21. The serial communications interface of claim 20, wherein the slave circuit further to drive a second sequence of bits on the first line after control of the first line is returned to the slave circuit.

22. The serial communications interface of claim 16, wherein the slave circuit further to drive the first line to a second logical value while the master circuit is driving the second line at the first logical value, and wherein the master circuit further to detect the second logical value on the first line and drive the clock signal on the second line upon detecting the second logical value.

23. The serial communications interface of claim 22, wherein the first sequence of bits comprises a command prefix consisting of one bit and a data field following the command prefix, the data field having a predefined number of bits.

24. The serial communications interface of claim 16, wherein the master circuit further to detect an error before driving the first sequence of bits, wherein the first sequence of bits comprises a command prefix having a first bit driven at the first logical value by the master circuit and a plurality of successive bits driven at the first logical value from the first line bias.

25. The serial communications interface of claim 24, wherein the slave circuit further to determine a length and an identity of a command at the slave circuit based on a value of the command prefix and drive a second sequence of bits on the first line by the slave circuit, the second sequence of bits having a predefined pattern.

26. The serial communications interface of claim 25, wherein the master circuit further to detect the predefined pattern and drive the second line at the first logical value based on detecting the predefined pattern.

27. The serial communications interface of claim 16, wherein the master circuit is implemented in a baseband processor of a wireless communications device and the slave circuit is implemented in a wireless transceiver.

28. The serial communications interface of claim 27, wherein the master circuit to drive the first sequence of bits by driving a command prefix, driving a data field following the command prefix, and driving a receive gain adjustment for the wireless transceiver.

29. The serial communications interface of claim 28, wherein the slave circuit further to drive the first line to a second logical value while the master circuit is driving the second line at the first logical value and wherein the master circuit further to detect the second logical value on the first line and drive the clock signal on the second line based on detection of the second logical value.

30. The serial communications interface of claim 29, wherein the wireless transceiver further to detect a radio frequency (RF) saturation condition and wherein the slave circuit further to drive the first line to the second logical value in response to the detection.

31. The serial communications interface of claim 16, wherein the master circuit is implemented in a baseband processor of a wireless communications device, wherein the slave circuit is implemented in a Bluetooth transceiver and wherein the master circuit to drive the first sequence of bits by driving a coexistence message.

* * * * *